United States Patent
Nix

(10) Patent No.: US 10,414,425 B2
(45) Date of Patent: Sep. 17, 2019

(54) CARRIAGE ACCESSORY

(71) Applicant: Heather Nix, Arvada, CO (US)

(72) Inventor: Heather Nix, Arvada, CO (US)

(*) Notice: Subject to any disclaimer, the term of this patent is extended or adjusted under 35 U.S.C. 154(b) by 0 days.

(21) Appl. No.: 15/839,238

(22) Filed: Dec. 12, 2017

(65) Prior Publication Data
US 2018/0162438 A1 Jun. 14, 2018

Related U.S. Application Data

(60) Provisional application No. 62/433,131, filed on Dec. 12, 2016.

(51) Int. Cl.
*B62B 9/14* (2006.01)
*A61G 5/10* (2006.01)
*B62B 9/26* (2006.01)
*B62B 9/00* (2006.01)

(52) U.S. Cl.
CPC ............ *B62B 9/142* (2013.01); *A61G 5/10* (2013.01); *B62B 9/005* (2013.01); *B62B 9/14* (2013.01); *B62B 9/26* (2013.01); *A61G 2200/14* (2013.01)

(58) Field of Classification Search
CPC .. B29B 9/142; B29B 9/14; B29B 9/26; A63H 33/006; B62B 9/142; B62B 9/14; B62B 9/26
USPC ........................................................ 446/227
See application file for complete search history.

(56) References Cited

U.S. PATENT DOCUMENTS

| | | |
|---|---|---|
| 4,533,170 A | 8/1985 | Banks et al. |
| 4,702,719 A | 10/1987 | Lapid |
| 4,722,713 A | 2/1988 | Williams et al. |
| 5,494,329 A * | 2/1996 | Gonzalez ........... B62B 9/14 135/88.01 |
| 5,542,732 A | 8/1996 | Pollman |
| D400,129 S | 10/1998 | Udelhoven |
| 5,930,854 A * | 8/1999 | O'Neill ........... A47D 13/063 135/135 |
| D475,659 S | 6/2003 | Diaz |
| 6,592,425 B2 | 7/2003 | Bapst et al. |
| 6,860,786 B2 | 3/2005 | Oren et al. |
| 6,877,763 B2 | 4/2005 | Ulrich |
| D554,028 S | 10/2007 | Quinn |
| D556,097 S | 11/2007 | Quinn |
| D571,691 S | 6/2008 | Quinn |
| D600,168 S | 9/2009 | Quinn |
| 8,746,794 B2 * | 6/2014 | Oren ............. A47D 13/102 297/118 |
| 8,864,547 B2 | 10/2014 | Elson et al. |

(Continued)

*Primary Examiner* — Noah Chandler Hawk
(74) *Attorney, Agent, or Firm* — Trenner Law Firm, LLC; Mark D. Trenner

(57) ABSTRACT

An example carriage accessory includes a base attachment, a top attachment, and a surround for a carriage. In an example, the surround has at least a first tubing member extending from the base attachment to the top attachment, a second tubing member extending from the base attachment to the top attachment. In another example, the surround further has at least a third tubing member extending from the base attachment to the top attachment. In another example, the surround further has at least a fourth tubing member extending from the base attachment to the top attachment. In an example, at least some of the tubing members are oriented perpendicular to each other when the carriage accessory is viewed from top-down.

20 Claims, 11 Drawing Sheets

(56) References Cited

U.S. PATENT DOCUMENTS

| | | | |
|---|---|---|---|
| 8,882,557 B2* | 11/2014 | Fair | A63H 33/006 |
| | | | 446/227 |
| 8,968,048 B2* | 3/2015 | Oren | A63H 33/006 |
| | | | 135/124 |
| 9,155,974 B2* | 10/2015 | Fair | A63H 33/006 |
| 9,463,821 B1 | 10/2016 | Critchley et al. | |
| 9,757,660 B2* | 9/2017 | Leibovics | A63H 33/006 |
| 9,821,240 B2* | 11/2017 | Hansen | A63H 33/22 |
| D843,272 S | 3/2019 | Nix | |
| 2004/0077269 A1 | 4/2004 | Oren et al. | |
| 2004/0242118 A1* | 12/2004 | Schreiber-Setzemski | A47D 15/003 |
| | | | 446/227 |
| 2006/0037274 A1* | 2/2006 | Perez | A47D 13/066 |
| | | | 52/646 |

* cited by examiner

CARRIAGE ACCESSORY

PRIORITY CLAIM

This application claims the priority benefit of U.S. Provisional Patent Application No. 62/433,131 filed Dec. 12, 2016 titled "Carriage Accessory" of Heather Nix, hereby incorporated by reference in its entirety as though fully set forth herein.

BACKGROUND

Carriages (e.g., strollers and wheelchairs) are commonplace. Unfortunately, many carriages have a typical appearance and are not readily customized for children.

DETAILED DESCRIPTION

Figure 1:
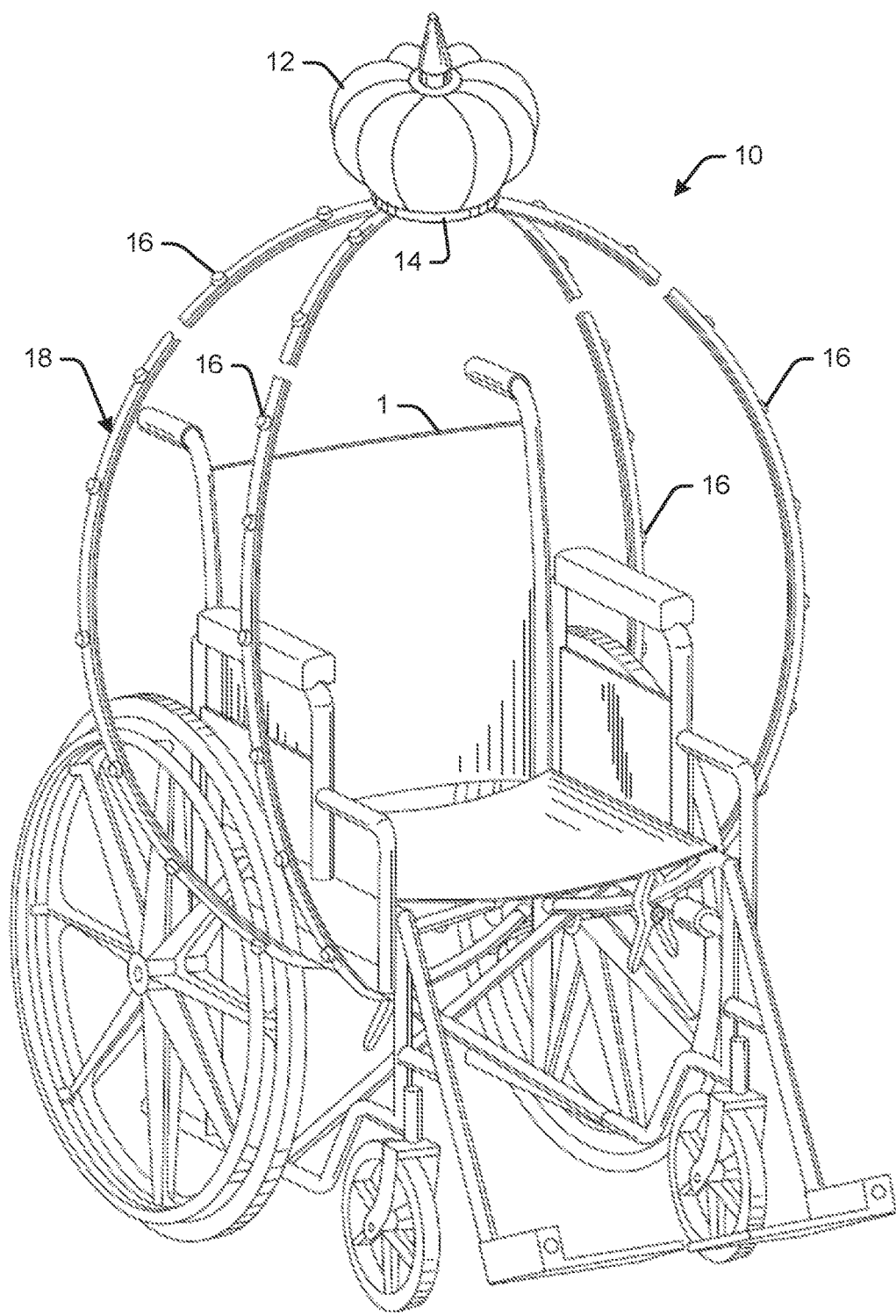
FIG. 1 is a perspective view of an example carriage accessory as it may be implemented on a wheelchair.

A carriage accessory is disclosed herein which may be attached to a conventional carriage (e.g., a wheelchair, stroller, wagon, etc.). An example carriage accessory includes a base attachment, a top attachment, and a surround for a carriage. In an example, the surround has at least a first tubing member extending from the base attachment to the top attachment, a second tubing member extending from the base attachment to the top attachment. In another example, the surround further has at least a third tubing member extending from the base attachment to the top attachment. In another example, the surround further has at least a fourth tubing member extending from the base attachment to the top attachment. In an example, at least some of the tubing members are oriented perpendicular to each other when the carriage accessory is viewed from top-down.

When implemented, for example, as an attachment to a conventional wheelchair, the carriage accessory provides special needs children with a fun and engaging decoration for their chair, transforming any wheelchair into a princess or other fun and decorative "carriage for the day." When implemented, for example, as an attachment to a conventional stroller or wagon, the carriage accessory provides children riding in the stroller or wagon with a fun and engaging decoration for their transportation, transforming their transportation into a princess or other fun and decorative "carriage for the day."

The carriage accessory may create positive attention from others for children who are confined to a wheelchair. It may also be entertaining to the child that is riding in the carriage.

It is noted that the examples described herein are provided for purposes of illustration, and are not intended to be limiting. Other devices and/or device configurations may be utilized to carry out the operations described herein.

It is also noted that broken lines shown in the drawings are to indicate that the tubing can be of any size and/or adjustable.

Before continuing, it is noted that as used herein, the terms "includes" and "including" mean, but is not limited to, "includes" or "including" and "includes at least" or "including at least." The term "based on" means "based on" and "based at least in part on."

Figure 2:
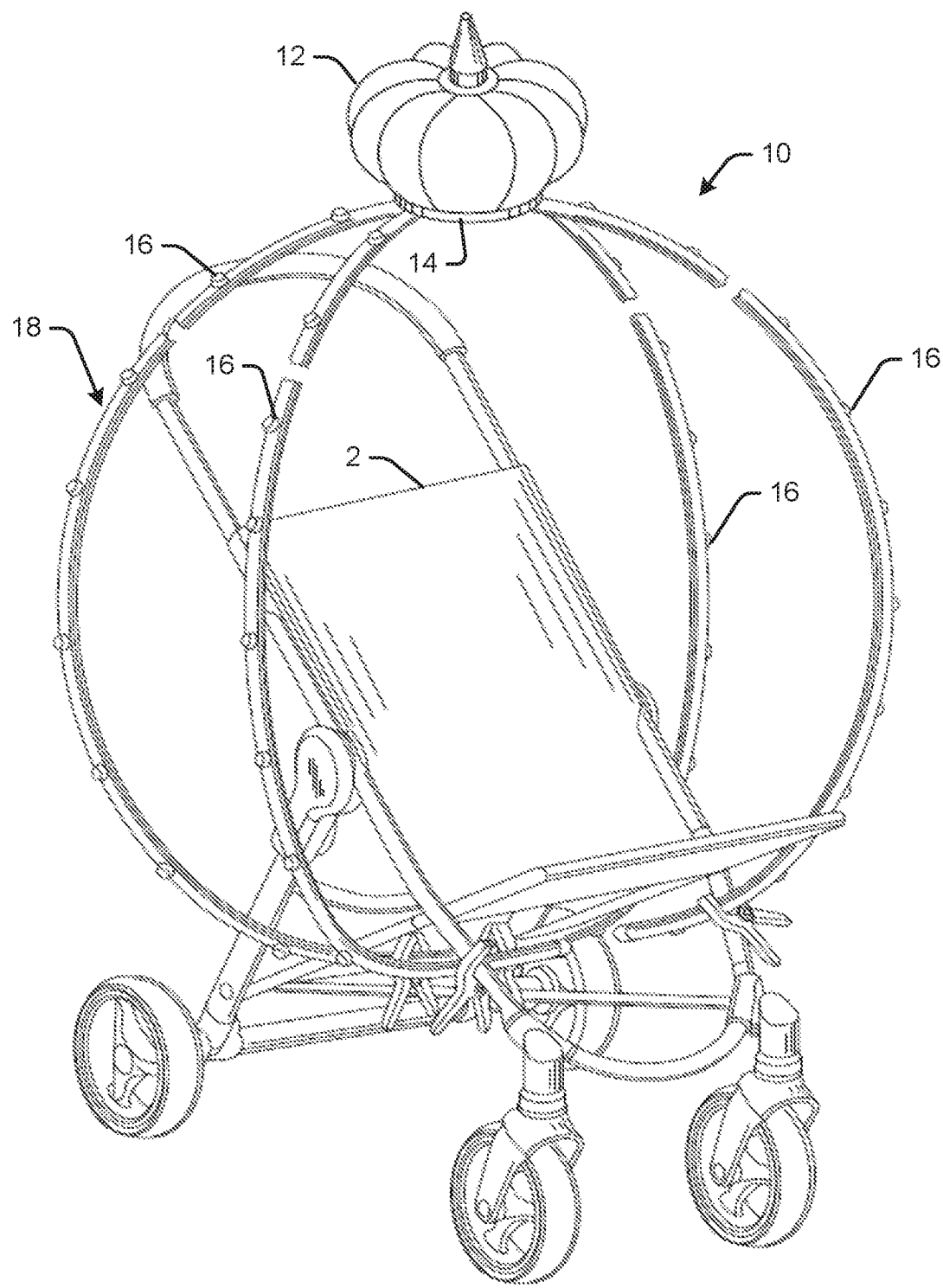
FIG. 2 is a perspective view of an example carriage accessory as it may be implemented on a stroller.

FIG. 1 is a perspective view of an example carriage accessory 10 as it may be implemented on a wheelchair 1. FIG. 2 is a perspective view of an example carriage accessory 10 as it may be implemented on a stroller 2. Of course, the carriage accessory 10 is not limited to implementing with any particular type, size, shape, or configuration of carriage. The wheelchair 1 and stroller 2 in FIGS. 1 and 2 are shown only for purposes of illustration of example carriages.

In an example, the carriage accessory 10 overlaps and connects to the wheelchair 1 or stroller 2, transforming the wheelchair 1 or stroller 2 (generally referred to herein as a "carriage") into a princess carriage or other decorative feature over the child. Of course, the carriage accessory 10 may transform any carriage in any suitable manner via any desired decoration(s). Decorations may include, but are not limited to, lights, tinsel, colors, crowns, superhero implements, etc.

In an example, a focal point 12 on the top of the carriage accessory 10 is interchangeable so that the end-user can choose any desired "topper". For example, the carriage accessory is shown in FIGS. 1 and 2 as it may be fitted with a princess crown (or King crown for boys). The top attachment 14 may provide a support for any of a variety of other design options, e.g., depending on the interest of the end-user. By way of illustration, the "crown" shown on the top attachment 14 in FIGS. 1 and 2 may be interchangeable with other design elements to make it more gender neutral or gender specific. For example, instead of a crown and tinsel, the accessory may include more boyish features, such as but not limited to sports, car, or superhero decorations.

In an example, the carriage accessory 10 has lights 16. Example lights 16 include, but are not limited to LED lighting. The lights 16 may be integrated, e.g., into the surround 18. The carriage accessory 10 may include pre-lit tubing (e.g., similar to an LED "rope"). The lights may be provided with an on and off capability, and can also be configured with blinking or streaming lights.

In an example, the carriage accessory 10 may also include a music player and/or other entertainment devices for the child riding in the carriage.

Figure 3:
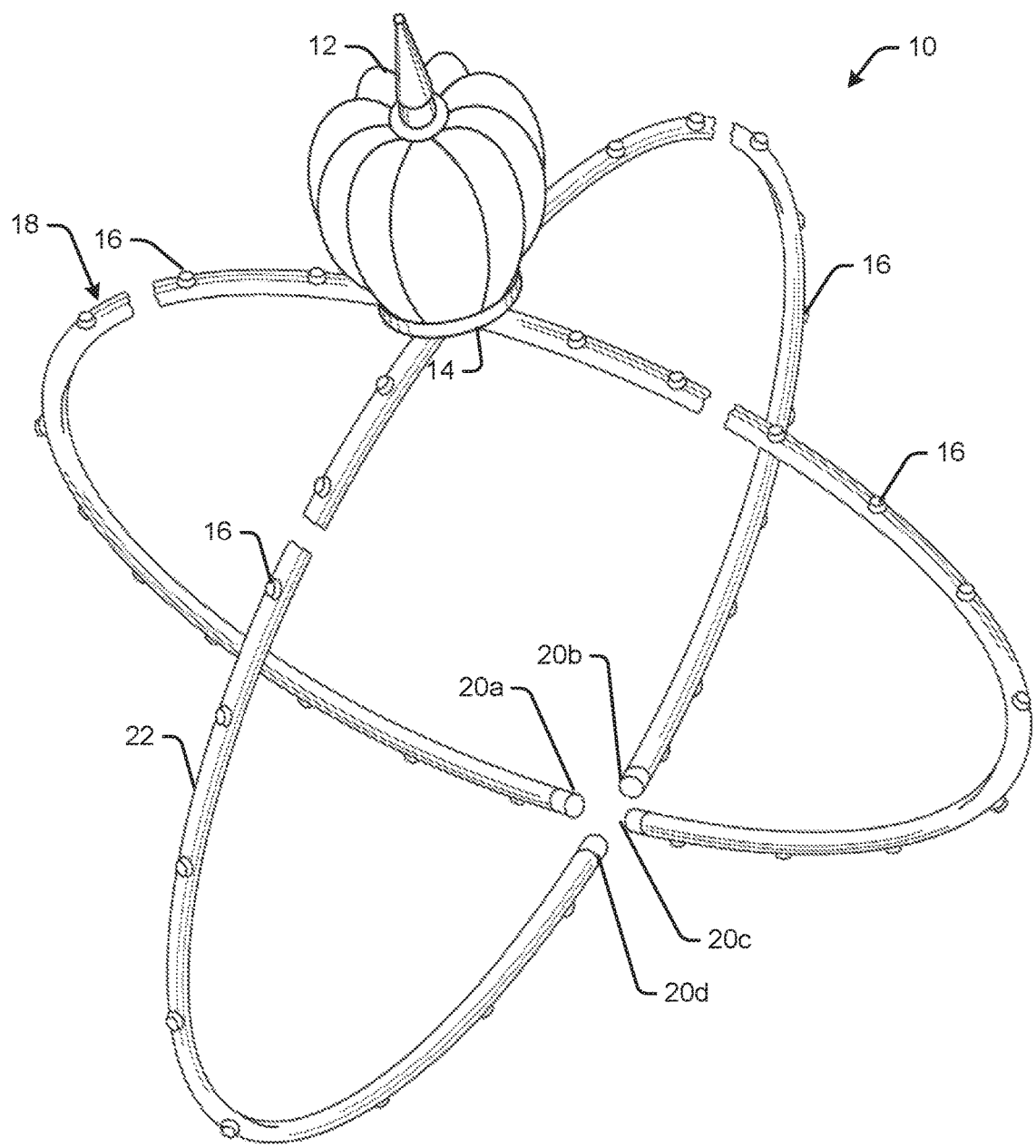
FIG. 3 is a perspective view of an example carriage accessory.
Figure 4:
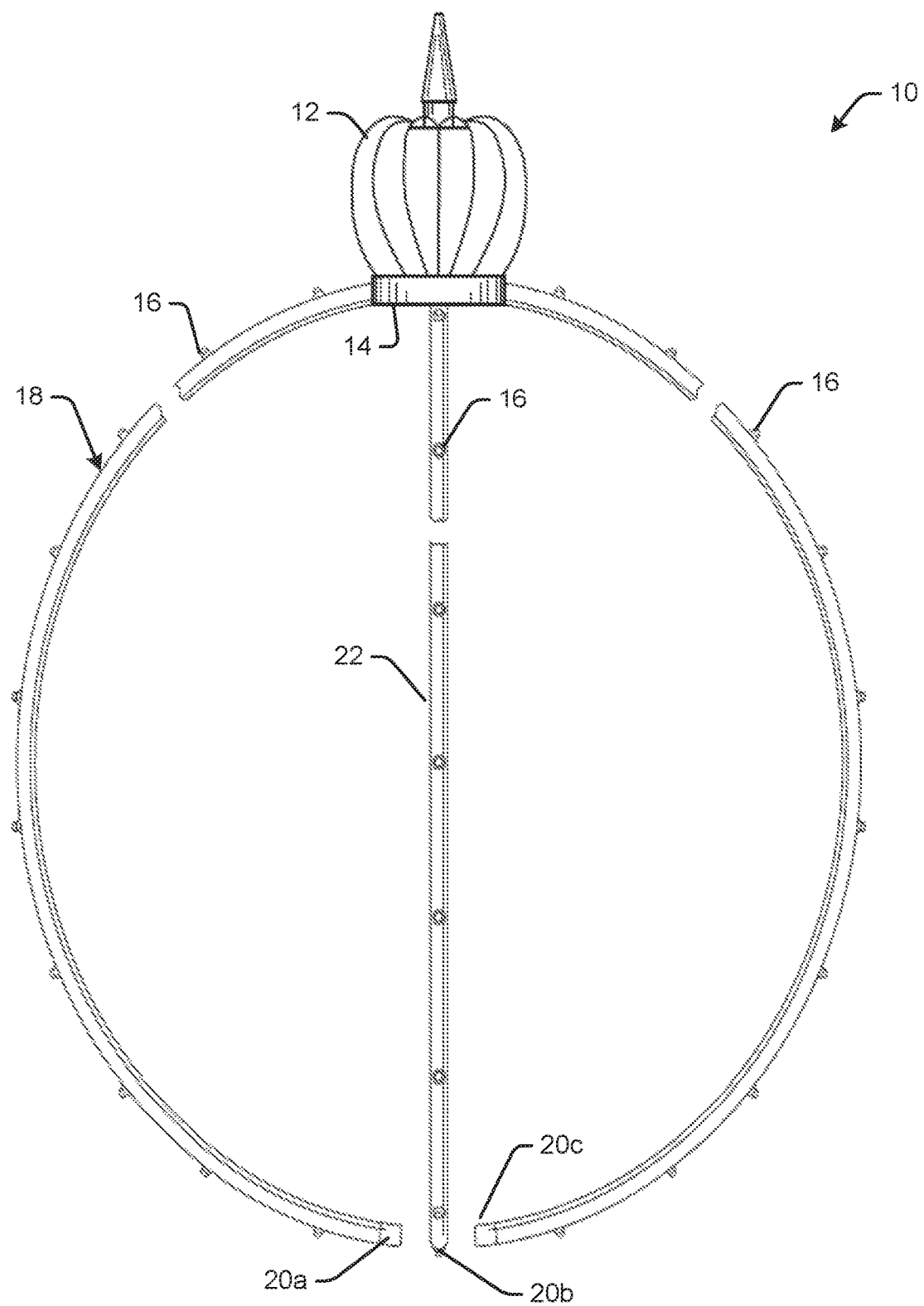
FIG. 4 is a side view of the example carriage accessory.

FIG. 3 is a perspective view of an example carriage accessory 10. FIG. 4 is a side view of the example carriage accessory 10. An example carriage accessory 10 includes a surround 18 for a carriage (e.g., wheelchair 1 in FIG. 1, or stroller 2 in FIG. 2), one or more base attachment 20*a-d* to connect the surround 18 to the carriage, and a top attachment 14 for including a focal point or decorative element 12.

In an example, the carriage accessory may be implemented to transform a convention carriage (e.g., a stroller, wheelchair or other carriage such as a wagon) into a decorative carriage for the seated person. The surround 18 may arch over the head of the passenger and have a detachable/ interchangeable piece 12 decorating or "crowning" the carriage. At least one decoration or other design element 12 (e.g., a removable and replaceable focal point) may be provided to customize the carriage accessory 10 for the end-user. The carriage accessory 10 overlaps the wheelchair or stroller and connects onto the stroller or wheelchair, making a decorative feature over and/or around the carriage.

In an example, the surround 18 for the carriage is formed by a plurality of tubing members 22. The surround may have any number of tubing members 22. In an example, the surround has a plurality of tubing members 22 that form a cross when viewed from the top (e.g., see, FIGS. 5 and 6).

Figure 5:
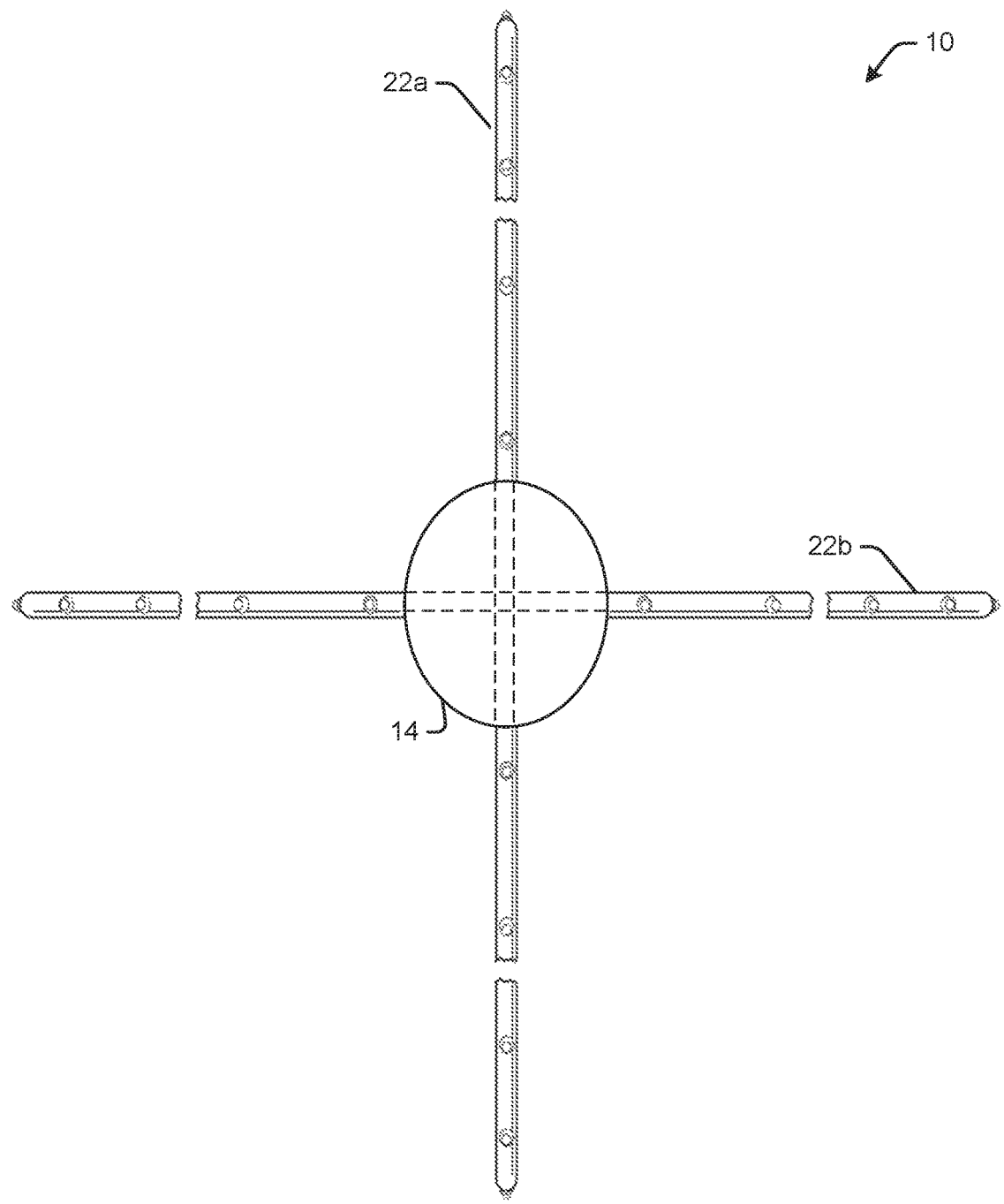
FIG. 5 is a top view of the example carriage accessory showing an example top attachment.

FIG. 5 is a top view of the example carriage accessory 10 showing an example top attachment 14. In this example, the surround 18 includes a first tubing member 22a extending from the base attachment 20a through the top attachment 14 as indicated by dashed lines, and back on an opposite side to the base attachment 20c. A second tubing member 22b extends from the base attachment 20b through the top attachment 14 and back on an opposite side to the base attachment 20d. The first tubing member 22a and the second tubing member 22b cross each other at the top attachment 14. For example, one tubing member crosses either over or under the other tubing member inside the top attachment 14.

Figure 6:
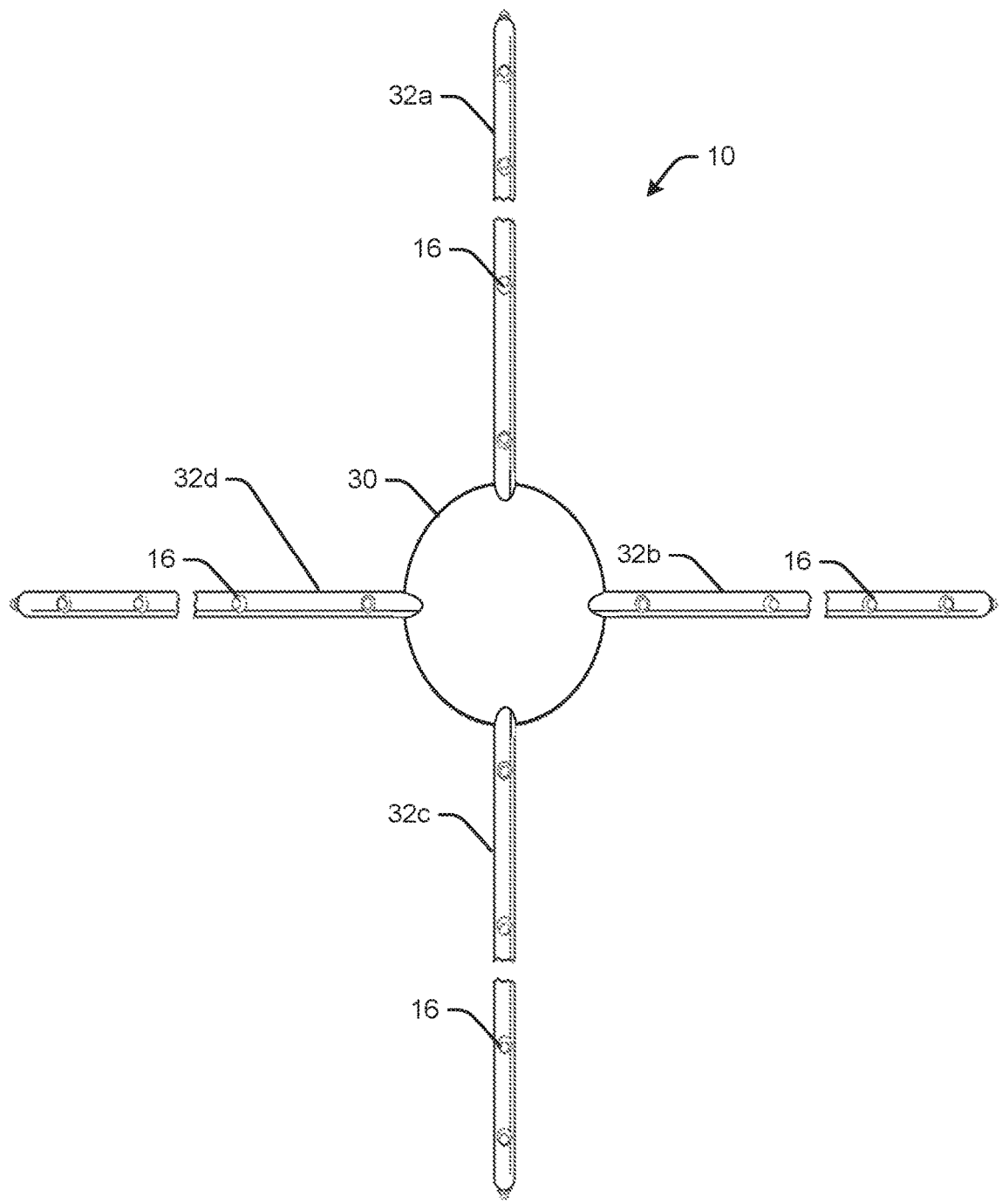
FIG. 6 is a top view of the example carriage accessory illustrating another example top attachment.

FIG. 6 is a top view of the example carriage accessory 10 illustrating another example top attachment 30. In this example, a plurality of tubing members 32a-d forming the surround 18 include a first tubing member 32a extending from the base attachment to the top attachment 30, a second tubing member 32b extending from the base attachment to the top attachment 30, a third tubing member 32c extending from the base attachment to the top attachment 30, and a fourth tubing member 32d extending from the base attachment to the top attachment 30.

It is noted that more or fewer tubing members may be provided than those shown. It is noted that the base attachment discussed above with reference to FIGS. 5 and 6 may be the base attachment(s) 20a-d discussed with reference to FIG. 3 (and below with reference to FIG. 7), the base attachment 36 discussed below with reference to FIG. 8, or any other base attachment mechanism.

It is noted that the carriage accessory 10 is not limited to any particular configuration of the surround. For example, the tubing members and top and/or bottom attachments may be formed as a unitary piece, and/or connect in different locations and/or according to different mechanisms. In addition, the tubing members are shown herein having a generally cylindrical configuration. But any shape and/or style members may be implemented and the term "tubing" as used herein is not limited to cylindrical and/or hollow members.

In an example, the carriage accessory 10 is manufactured of weather-resistant material. However, the carriage accessory 10 can be made of any suitable material.

The carriage accessory 10 may be adjustable. For example, the tubing may include a tube within a tube so that it can be extended or retracted. In an example, the adjustable tubing of the carriage accessory 10 makes it portable. The carriage accessory 10 may be "retracted" so that it is travel-friendly (e.g., for carrying in a vehicle or on an airplane). Adjustable tubing may include a "tube within a tube" configuration (see e.g., 33a-d) wherein a smaller diameter tube is fitted within a larger diameter tube and slide to the desired length, wherein the two tubes are connected (e.g., typically by a spring-loaded button within the inner tube that pops out of an opening in one or both of the outer and inner tubes. The adjustable tubing of the carriage accessory 10 can also make it interchangeable to fit with various types, styles, and/or sizes of conventional carriages.

In another example, the carriage accessory 10 may be provided in various sizes (e.g., a regular sized version for strollers and wheelchairs, and a "mini" version for car seats). Although four tubing sections are shown for the surround 18 in the drawings, more or fewer tubing sections may be provided.

The example carriage accessory 10 may be provided to the end-user according to any desired design (e.g., a princess carriage). In another example, the design of the carriage accessory 10 may be decorated by the end-user and/or modified and/or reconfigured by the end-user.

Attachments may also be provided separately, e.g., to customize or further decorate the carriage accessory 10. For purposes of illustration, an example design is for the carriage accessory 10 to have a crown. The crown attachment may be changed out for other design components, e.g., depending on the interest of the end-user.

Figure 7:
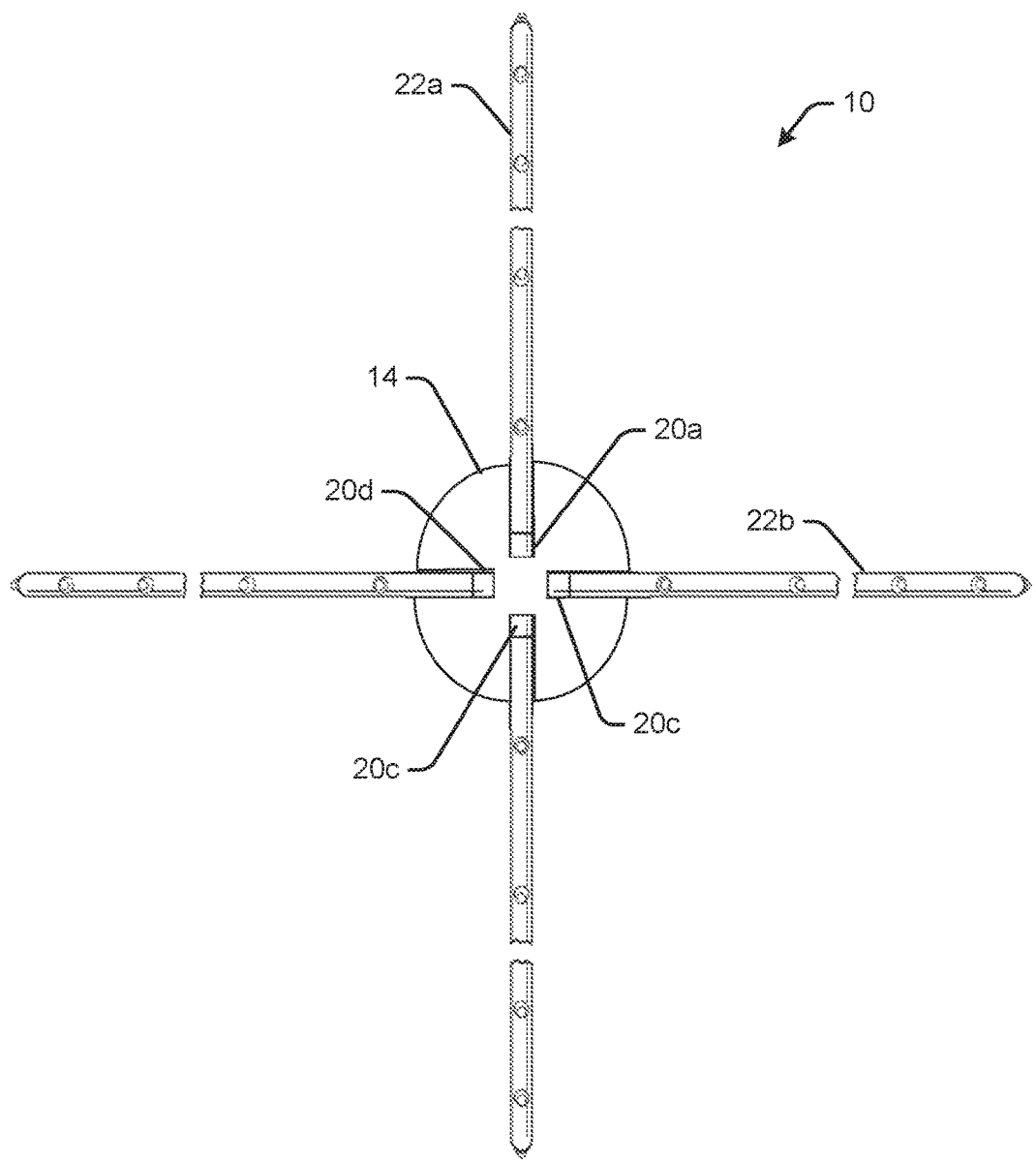
FIG. 7 is a bottom view of the example carriage accessory showing an example base attachment.

The example carriage accessory 10 may also include a base attachment for attaching the first tubing and the second tubing to a carriage. FIG. 7 is a bottom view of the example carriage accessory 10 showing an example of base attachment with separate attachment points 20a-d. In this example, the base attachments 20a-d are attached by connected some or all of a plurality of tubing members of the surround 18 individually to the carriage. This may be by clamps (e.g., as can be seen in FIGS. 1 and 2), adjustable clamps, or other suitable attachment mechanisms.

Figure 8:
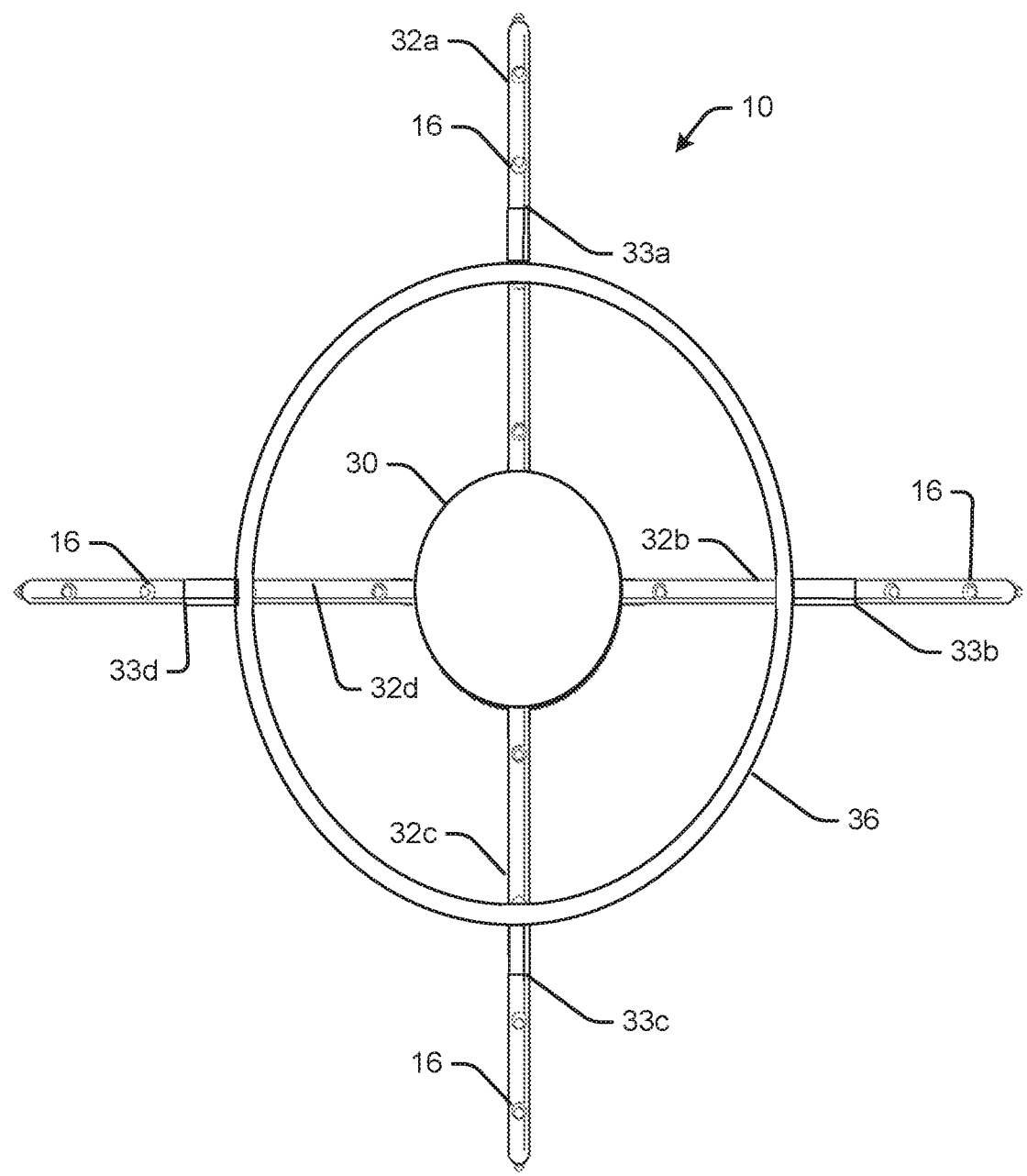
FIG. 8 is a bottom view of the example carriage accessory illustrating another example base attachment.

FIG. 8 is a bottom view of the example carriage accessory 10 illustrating another example base attachment 36. In this example, some or all tubing members of the surround 18 connect to a base attachment 36 that is configured as a hoop. The hoop may hang around the carriage (e.g., the stroller or wheelchair) without attaching to the carriage. In another example, the base attachment 36 connects to the carriage (e.g., by hook-and-loop or VELCRO™, zip tie, ribbons, clamp or otherwise).

Figure 9A:
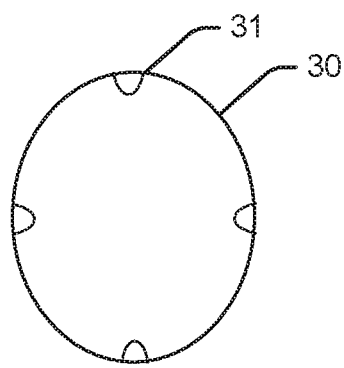
FIGS. 9A-9B show an example top attachment and base attachment.
Figure 9B:
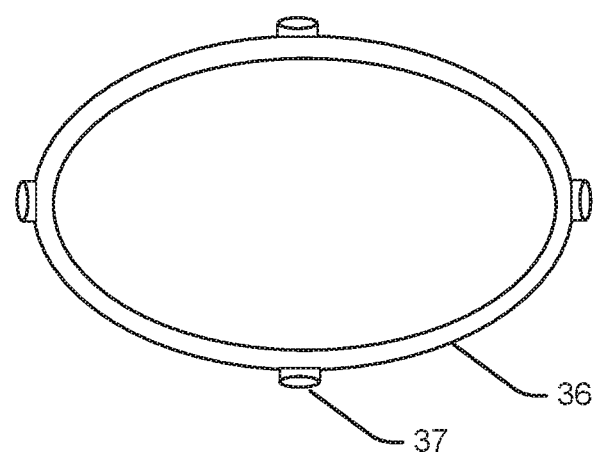

FIGS. 9A-9B show an example top attachment 30 and base attachment 36. In FIG. 9A, the top attachment 30 includes an opening 31 positioned at each location on the top attachment 30 where an arm 32a-d may be connected. In FIG. 9B, the base attachment 36 includes an opening 37 positioned at each location on the top attachment 30 where an arm 32a-d may be connected. The arms 32a-d may be connected to form the carriage. It is noted that in the example shown in FIG. 9A, the openings 31 extend partially around the edge and into the top of the top attachment 30. When the arms 32a-d are installed in this opening, it enables the arms 32a-d to curve above the top attachment 30 and give the appearance of a "pumpkin" shaped carriage, as can be seen for example in FIGS. 10-11.

Figure 10:
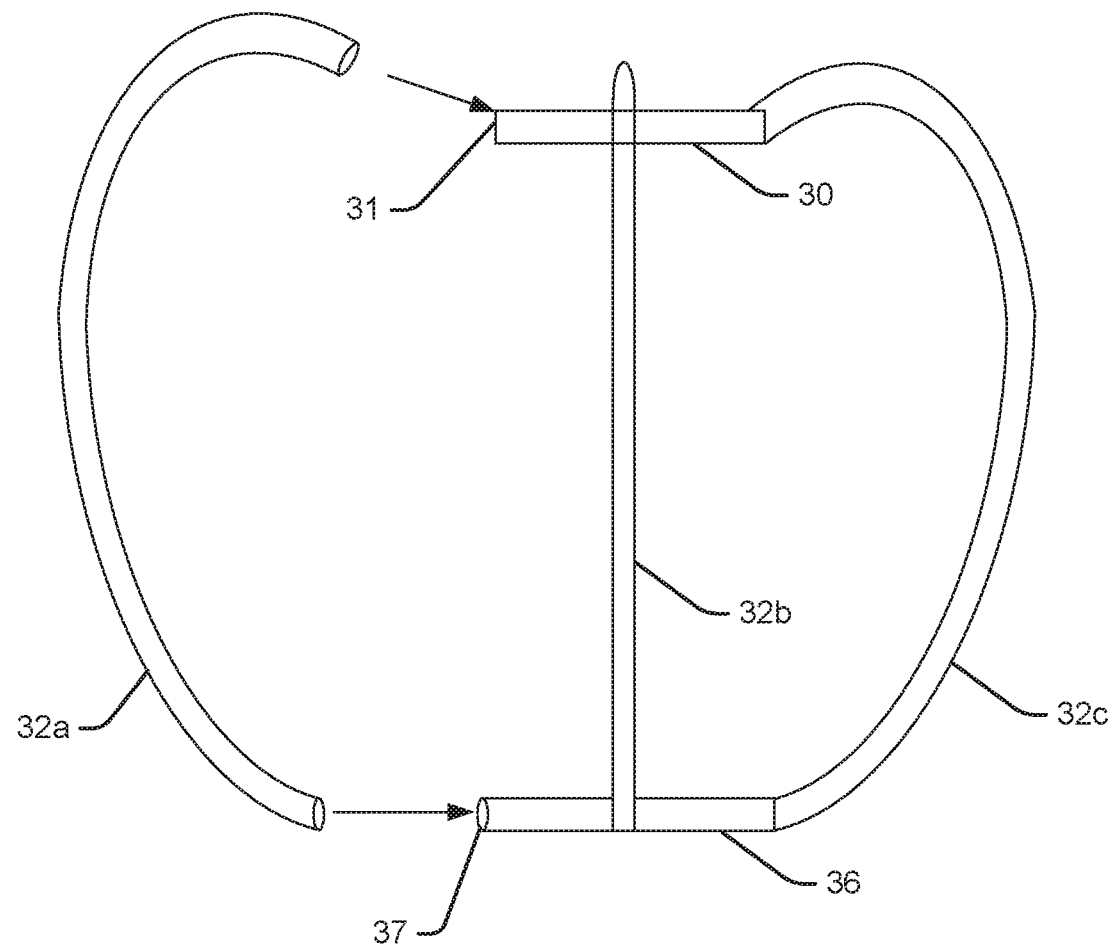
FIGS. 10-11 illustrate example assembly of a carriage accessory.
Figure 11:
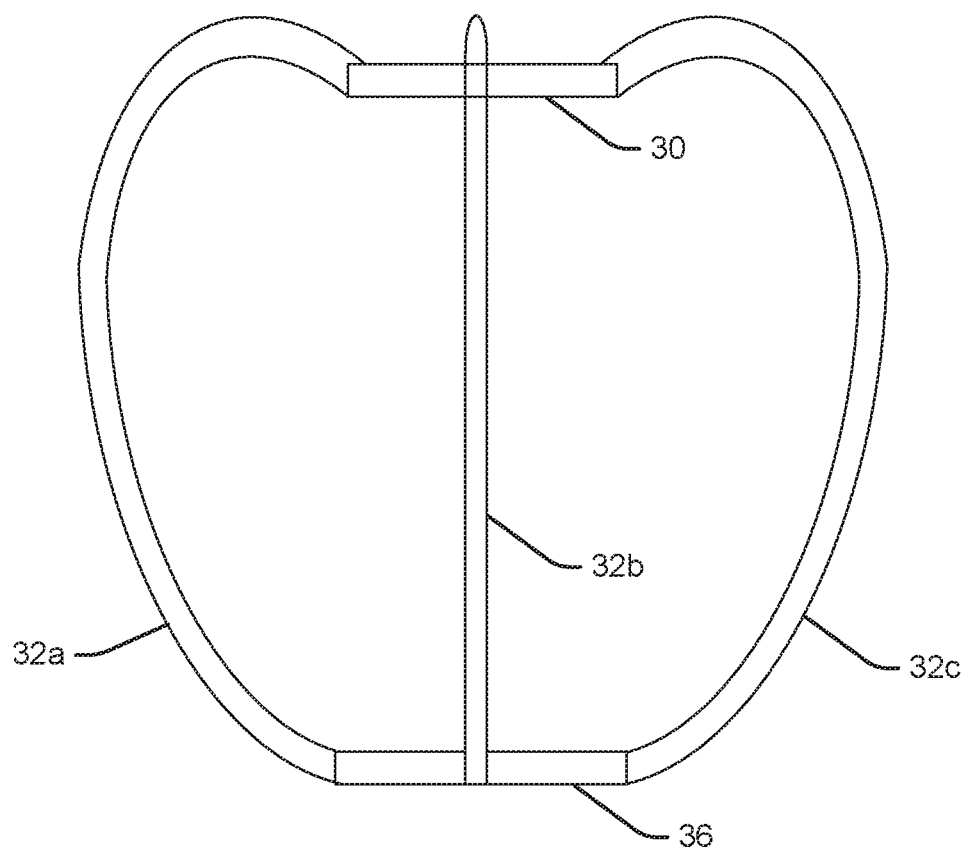

FIGS. 10-11 illustrate example assembly of a carriage accessory. In this example, the tubing members 32a-d may be attached on one end to the base attachment 36, and on the opposite end of the tubing members 32a-d to the top attachment 30. Connecting the tubing members 32a-d to the top attachment 30 and bottom attachment(s) may be by frictional engagement (e.g., a tight fit) of the tubing members 32a-d in an opening formed in the base attachment 36 and/or the top attachment 30.

It is noted that attachment of the tubing members in any example are not limited to any particular configuration. Fasteners and/or adhesive may also be used to secure the tubing members to the base attachment and/or the top attachment. In another example, the tubing members may be integrally formed as part of the top attachment and/or base attachment.

It is noted that the examples shown and described are provided for purposes of illustration and are not intended to be limiting. Still other examples are also contemplated.

The invention claimed is:

1. A carriage accessory, comprising:
   a first tubing member and a second tubing member defining a spherically shaped surround for a carriage, the first and second tubing members each formed into a circular shape around a seat of the carriage;
   a base attachment for each end of the first and second tubing members, the base attachment to connect the surround to the carriage with each end of the first and second tubing members connecting independent of one another to the carriage under the seat of the carriage and above the ground; and
   a top attachment for including a decorative element, the top attachment maintaining the first tubing member crossing substantially perpendicular to the second tubing member in a space above the seat of the carriage.

2. The carriage accessory of claim 1, further comprising integrated lighting in the surround.

3. The carriage accessory of claim 1, further comprising a removable and replaceable focal point provided for the top attachment.

4. The carriage accessory of claim 1, further comprising a sound emitting device.

5. The carriage accessory of claim 1, wherein the surround includes retractable tubing members.

6. The carriage accessory of claim 1, wherein the surround is size-adjustable.

7. The carriage accessory of claim 1, wherein the surround is foldable.

8. The carriage accessory of claim 1, wherein the first tubing member and the second tubing member cross each other through the top attachment.

9. A carriage accessory, comprising:
   a spherically shaped surround for a carriage, the surround configured to mount in a space formed under the carriage above the ground, the surround having a plurality of tubing members;
   a circular shaped base attachment for the surround of the carriage, the circular shaped base attachment having a plurality of openings formed therein and spaced apart from one another around a perimeter of the circular shaped base attachment; and
   a circular shaped top attachment for including a decorative element, the circular shaped top attachment having a plurality of openings formed therein and spaced apart from one another around a perimeter of the circular shaped base attachment;
   wherein each of the plurality of tubing members of the surround connecting on a first end to one of the openings formed in the base attachment, and each of the plurality of tubing members of the surround connecting on a second end to one of the openings formed in the top attachment.

10. The carriage accessory of claim 9, wherein the carriage is at least one of a wheelchair, a car seat, a stroller, and a wagon.

11. The carriage accessory of claim 9, further comprising integrated lighting in the surround.

12. The carriage accessory of claim 9, further comprising a removable and replaceable focal point provided for the top attachment.

13. The carriage accessory of claim 9, further comprising a sound emitting device.

14. The carriage accessory of claim 9, wherein the surround includes retractable tubing members.

15. The carriage accessory of claim 9, wherein the surround is size-adjustable and foldable.

16. A carriage accessory, comprising:
    a base attachment;
    a top attachment; and
    a first tubing member, a second tubing member, a third tubing member, and a fourth tubing member, each of the tubing members having a body formed between a first end and a second end, wherein the first end of each of the tubing members is configured to attach to the base attachment beneath a seat of a carriage above the ground, and wherein the second end of each of the tubing members is configured to attach to the top attachment above the seat of the carriage, the tubing members forming a spherically shaped surround for the carriage, the surround defined by the body of each of the tubing members extending in a bowed shape between the base attachment and the top attachment, wherein the tubing members are oriented perpendicular to each other when the carriage accessory is viewed from top-down.

17. The carriage accessory of claim 16, further comprising integrated lighting in the surround and a sound emitting device.

18. The carriage accessory of claim 16, further comprising a removable and replaceable focal point provided for the top attachment.

19. The carriage accessory of claim 16, wherein the surround includes retractable tubing members.

20. The carriage accessory of claim 16, wherein the surround is size-adjustable and foldable.

* * * * *